(12) United States Patent
Troy

(10) Patent No.: US 8,319,951 B1
(45) Date of Patent: Nov. 27, 2012

(54) LOCAL POSITIONING SYSTEM

(75) Inventor: James J. Troy, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 441 days.

(21) Appl. No.: 12/561,544

(22) Filed: Sep. 17, 2009

(51) Int. Cl.
*G01C 3/08* (2006.01)

(52) U.S. Cl. ........ 356/5.01; 356/4.01; 356/4.1; 356/5.1; 356/5.15; 701/301

(58) Field of Classification Search ........ 356/3.01–28.5, 356/141.01–141.1; 340/436; 701/301
See application file for complete search history.

(56) References Cited

U.S. PATENT DOCUMENTS

| | | | | |
|---|---|---|---|---|
| 5,249,157 A | * | 9/1993 | Taylor | 340/903 |
| 5,805,275 A | * | 9/1998 | Taylor | 356/3.16 |
| 6,285,445 B1 | * | 9/2001 | Winfield et al. | 356/28 |
| 2006/0007021 A1 | * | 1/2006 | Konya et al. | 340/958 |
| 2008/0002190 A1 | * | 1/2008 | Romain et al. | 356/139.01 |
| 2009/0086014 A1 | | 4/2009 | Lea et al. | |
| 2009/0086199 A1 | | 4/2009 | Troy et al. | |

OTHER PUBLICATIONS

Craig, J.J., *Introduction to Robotics Mechanics & Control*, Addison-Wesley Publishing Company, 1986, pp. 139-146.

* cited by examiner

*Primary Examiner* — Luke Ratcliffe
(74) *Attorney, Agent, or Firm* — Mark Pellegrini

(57) ABSTRACT

A local positioning system including a sighting device for indicating an aim point on a target object, the target object having a local coordinate system, an articulation mechanism connected to the sighting device to effect movement of the sighting device about at least two independent axes, and a controller in communication with the articulation mechanism, the controller being configured to control a velocity of the sighting device about each of the independent axes to obtain desired movement of the aim point on the target object in the local coordinate system.

19 Claims, 8 Drawing Sheets

(EXISTING SYSTEM)

(EXISTING SYSTEM)

LOCAL POSITIONING SYSTEM

FIELD

The present patent application relates to local positioning systems and, more particularly, to local positioning systems configured to control the position and velocity of an aim point on a target object by controlling the actuator velocities of the local positioning device and, even more particularly, to local positioning systems configured for Jacobian-based control of the actuator velocities of the local positioning system.

BACKGROUND

A local positioning system ("LPS") consists of actuators and a motion controller, and is used to measure and indicate locations of points in the local coordinate system of the target object. An LPS may be used to indicate (e.g., with a laser spot) an aim point on a target object. The aim point is the intersection of the device aim axis and the surface of the target object. A typical LPS may include a camera and a laser-based range meter mounted on a 2-axis, motorized pan-tilt unit. The pan-tilt unit may be controlled by a computer in either interactive control mode, wherein the user instructs the LPS where to point using an input device (e.g., a multi-axis joystick), or automated position playback mode, wherein the computer instructs the LPS where to point based upon stored data.

A user may receive visual feedback from the LPS by observing the movement of the aim point (e.g., the laser spot) as it moves from target location to target location across the target object. However, difficulty controlling the LPS in the local coordinate system may arise when the requested motion requires an aim direction of the LPS that is not perpendicular to the surface of the target object—a common situation, as those skilled in the art will appreciate. In such a situation, the direction and speed of motion of the aim point will not be in the exact direction and speed that the user specified.

For example, as shown in FIG. 1, a local positioning device 10 may align its aiming axis by projecting a laser beam 11, which terminates in a laser spot 12 (i.e., the aim point) on a target object 14 having a local coordinate system 16. In this example, the local positioning device 10 includes an articulation mechanism having two intersecting rotational actuators with internal motion specified in terms of pan and tilt angles. An input command to the local positioning device 10 to draw a straight line across the x-axis of the target object 14 may not yield straight, horizontal line motion from the point of view of the local positioning device 10, but rather may result in an arc-shaped path with mostly horizontal motion and some amount of positive or negative vertical motion, depending on the aim axis intersection angle and on the type of articulation mechanism used to position the beam 11. For the type of local positioning device shown, the result is a perceived curved line 18 being drawn across the target object 14 as the local positioning device 10 moves the projected aiming axis from one target location to another target location. Furthermore, the local velocity (as measured in target coordinates) of the aim point laser spot 12 moving across the target object 14 may not be constant throughout the range of motion, but rather may increase at a non-linear rate as the laser spot 12 gets further away from perpendicular alignment with the target object 14.

As another example, as shown in FIG. 2, the local positioning device 10 may be instructed to trace a circle on the target object 14' by moving the laser spot 12'. Using inverse kinematics alone, the process of tracing the circle involves making a sequence of points on the perimeter of the desired shape, thereby resulting in a piecewise linear path 20 that only somewhat resembles a circle. Indeed, multi-segment paths are required even for a simple straight line shape since the motion between the points will not be linear due to the rotation-based motion of the point-to-point control of the pan-tilt device. This requires a large number of positions to produce a close approximation of the shape. Therefore, in the automated position playback mode, the application software sends a Move-To command for each point in which the pan-tilt device comes to stop at each point, which causes the process of tracing shapes to be too slow for practical application in many of the intended use cases (such as area identification). In addition, multi-segment path with a large number of starts and stops may lead to excessive ware and tear on the device's components.

Accordingly, those skilled in the art continue to seek advances in the field of local positioning systems, including obtaining motion in the target coordinate system that reflects the intentions of the user such that interactive control mode and automated position playback mode would be improved.

SUMMARY

In one aspect, the disclosed local positioning system may include a sighting device for indicating an aim point on a target object, the target object having a local coordinate system, an articulation mechanism connected to the sighting device to effect movement of the sighting device about at least two independent axes, and a controller in communication with the articulation mechanism, the controller being configured to control a velocity of the sighting device about each of the independent axes to obtain desired motion of the aim point on the target object in the local coordinate system.

In another aspect, the disclosed local positioning system may include a sighting device for indicating an aim point on a target object, the target object having a local coordinate system, a pan-tilt unit connected to the sighting device to effect movement of the sighting device about a pan axis and a tilt axis, and a controller in communication with the pan-tilt unit, the controller being configured to control a first velocity of the sighting device about the pan axis and a second velocity of the sighting device about the tilt axis to obtain desired motion of the aim point on the target object in the local coordinate system.

In another aspect, the disclosed method for controlling an aim point on a target object may include the steps of: (1) providing a sighting device for indicating the aim point on the target object, wherein the sighting device is connected to an articulation mechanism that effects movement of the sighting device about at least two independent axes, (2) obtaining a target velocity of the aim point in the local coordinate system of the target object, (3) determining a joint velocity about each of the independent axes required to effect the target velocity, and (4) communicating the joint velocities to the articulation mechanism.

Other aspects of the disclosed local positioning system will become apparent from the following description, the accompanying drawings and the appended claims.

DETAILED DESCRIPTION

The present disclosure provides a local positioning system and method that transforms motion control inputs, specifically position and velocity inputs, defined in the local coordinate system of a target object into pan and tilt velocity commands for the multi-axis articulation mechanism of the local positioning system, thereby providing enhanced interactive position and velocity tracking, as well as non-stop motion path playback. Specifically, enhanced interactive position/velocity control of the aim point and path playback may be achieved using real-time computation of the inverse Jacobian matrix to provide velocity-based motion control for Cartesian velocities defined in target coordinates.

Figure 1:
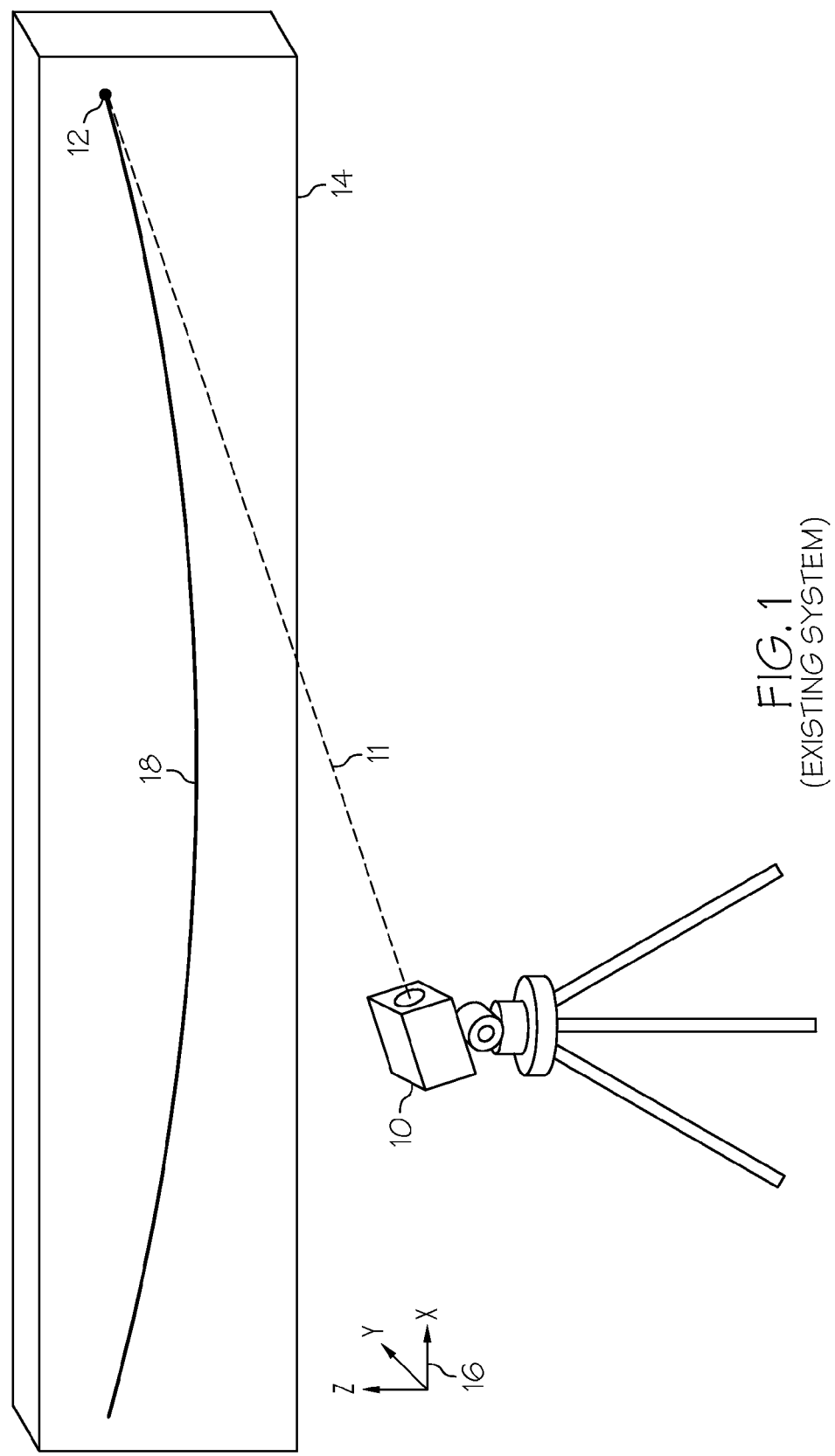
FIG. 1 is a partially schematic perspective view of a typical local positioning system shown tracing an output path on a target object based on a horizontal input.
Figure 2:
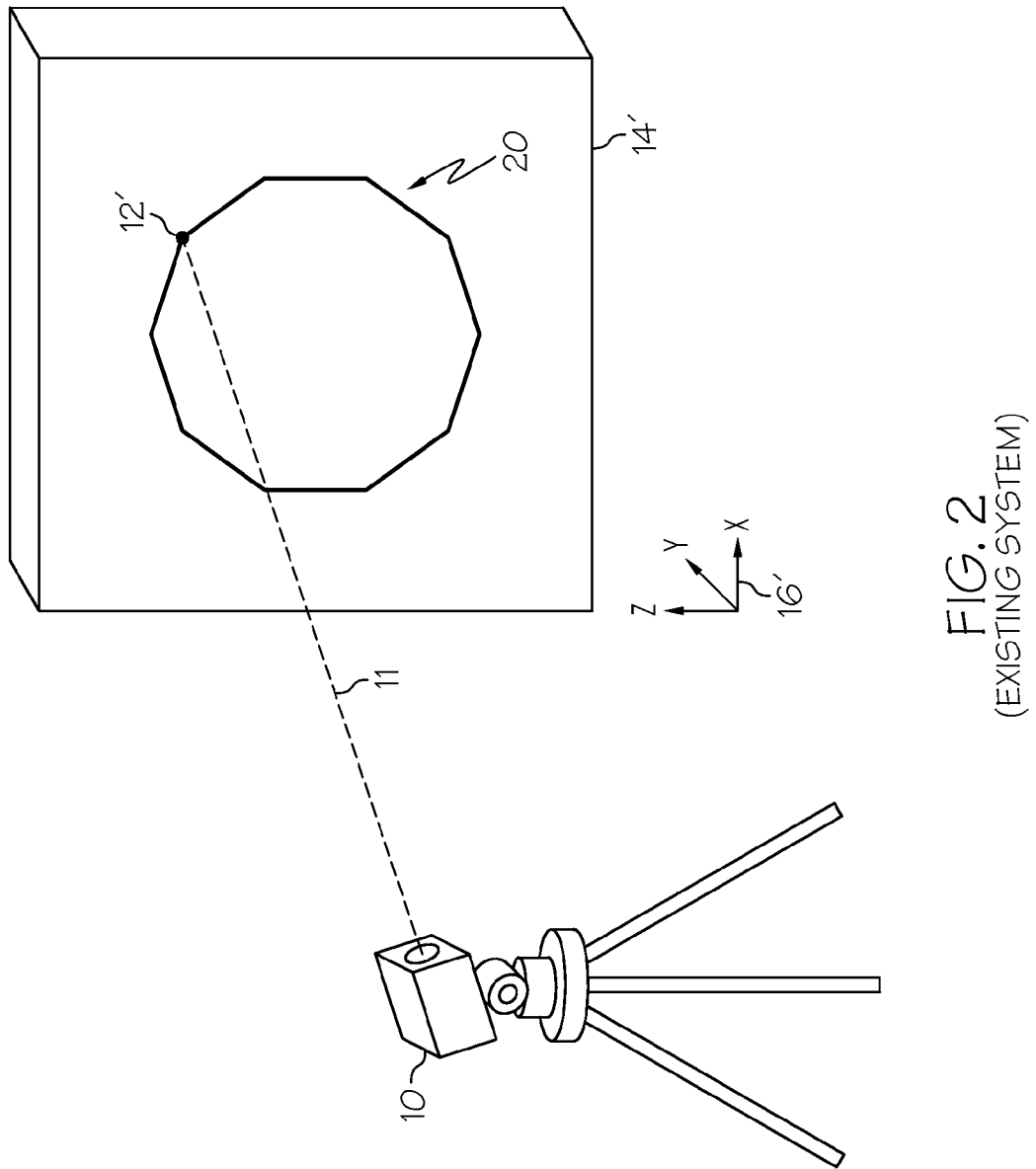
FIG. 2 is a partially schematic perspective view of the local positioning system of FIG. 1 shown tracing a segmented circle-shaped path on a target object.
Figure 3:
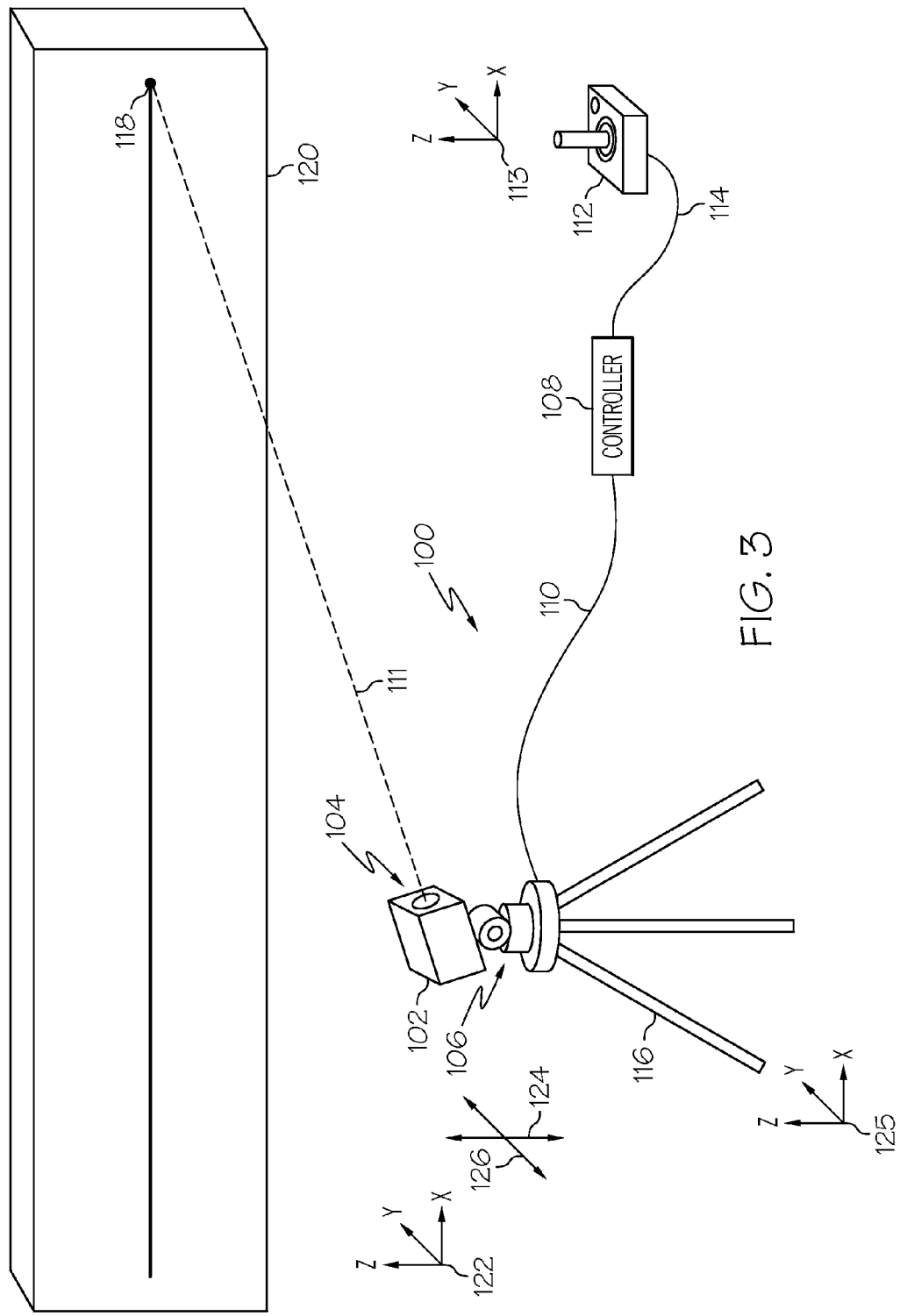
FIG. 3 is a partial schematic perspective view of a local positioning system in accordance with one aspect of the present disclosure, wherein the local positioning system motion controller is directing the system to trace a horizontal line on a target object.

Referring to FIG. 3, one aspect of the disclosed local position system ("LPS"), generally designated 100, may include a sighting device 102, a distance measuring mechanism 104, a multi-axis articulation mechanism 106 and a controller 108. The LPS 100 may have its own local coordinate system 125. The controller 108 may be in communication (either one-way or two-way communication) with the multi-axis articulation mechanism 106 by way of a first control cable 110. An optional input device 112 (e.g., a joystick, keypad, mouse or the like) may be in communication (either one-way or two-way communication) with the controller 108 by way of a second control cable 114 or wireless connection (not shown). For convenience, the sighting device 102 and associated multi-axis articulation mechanism 106 may be mounted on a support structure 116, such as a tripod or other appropriate support structure.

The sighting device 102 may be any device or system that is capable of indicating an aim point 118 on a target object 120 having a local coordinate system 122 by intersecting an aim axis 111 (e.g., a laser beam) with the surface of the target object 120. In one particular example, the sighting device 102 may be a laser (or other light beam generating device) capable of project a spot at the aim point 118 on the target object 120. Other examples of useful sighting mechanisms 102 include scopes having cross-hairs, telescopes and cameras. In alternate embodiments, the laser/light beam may be replaced with another type of direction indicator, such as a continuous stream of liquid, discrete particles, or sounds waves.

The distance measuring mechanism 104 may be any device or system capable of measuring the distance between the aim point 118 on the target object 120 and the LPS 100. For example, the distance measuring mechanism 104 may be a laser range finder, as is known in the art. In one particular aspect, as shown in FIG. 3, the sighting mechanism 102 and the distance measuring mechanism 104 may be combined as a single device—a laser range finder that both projects a laser spot at the aim point 118 and also measures the distance to the aim point 118. The distance along the aim point axis from the LPS 100 to the aim point on the target object may also be approximated when information about the surface geometry is available. This approximation is useful in situations where the actual distance measurement takes longer than desired for interactive use.

In one aspect, the multi-axis articulation mechanism 106 may be a 2-axis pan-tilt unit configured to move the sighting device 102 about the vertical, pan axis 124 and the horizontal, tilt axis 126 in response to signals received from the controller 108. Actuators, such as servo-motors or the like, in the pan-tilt unit 106 may receive and respond to command signals from the controller 108 by adjusting the angular position of the sighting device 102 about the pan 124 and tilt 126 axes, as well as the angular speed at which the sighting device 102 moves about the pan 124 and tilt 126 axes. In return, the pan-tilt rotational encoders may send current angular position data back to the controller 108. The command signals applied to the pan-tilt unit 106 may be computed by the controller 108 in response to user instructions (e.g., manipulation of the input device 112) or an automatic path generator.

The controller 108 may be any device or system capable of making the necessary computations, generating the command signals and communicating the command signals to the multi-axis control unit 106. For example, the controller 108 may be a computer, such as a personal computer, embedded microprocessor, or other high-speed processing device.

The command signals may be obtained using a Jacobian-based method to solve for the device velocities based on input target velocities specified in the coordinate system 122 of the target object 120. However, in order to use the Jacobian-based method, the kinematics of the LPS 100 and the target object must form a closed chain. This is achieved in the field of robotics when the end effector of the robotic arm comes in contact with the target workpiece being moved along a specified path. However, the LPS 100 does not close the kinematic loop with an end-effector that contacts the target object 120. Nonetheless, from a mathematical point of view, the aim point 118 on the target object 120 (e.g., the laser beam spot on the target object) can be considered the final "virtual" link that closes the kinematic chain.

Figure 5:
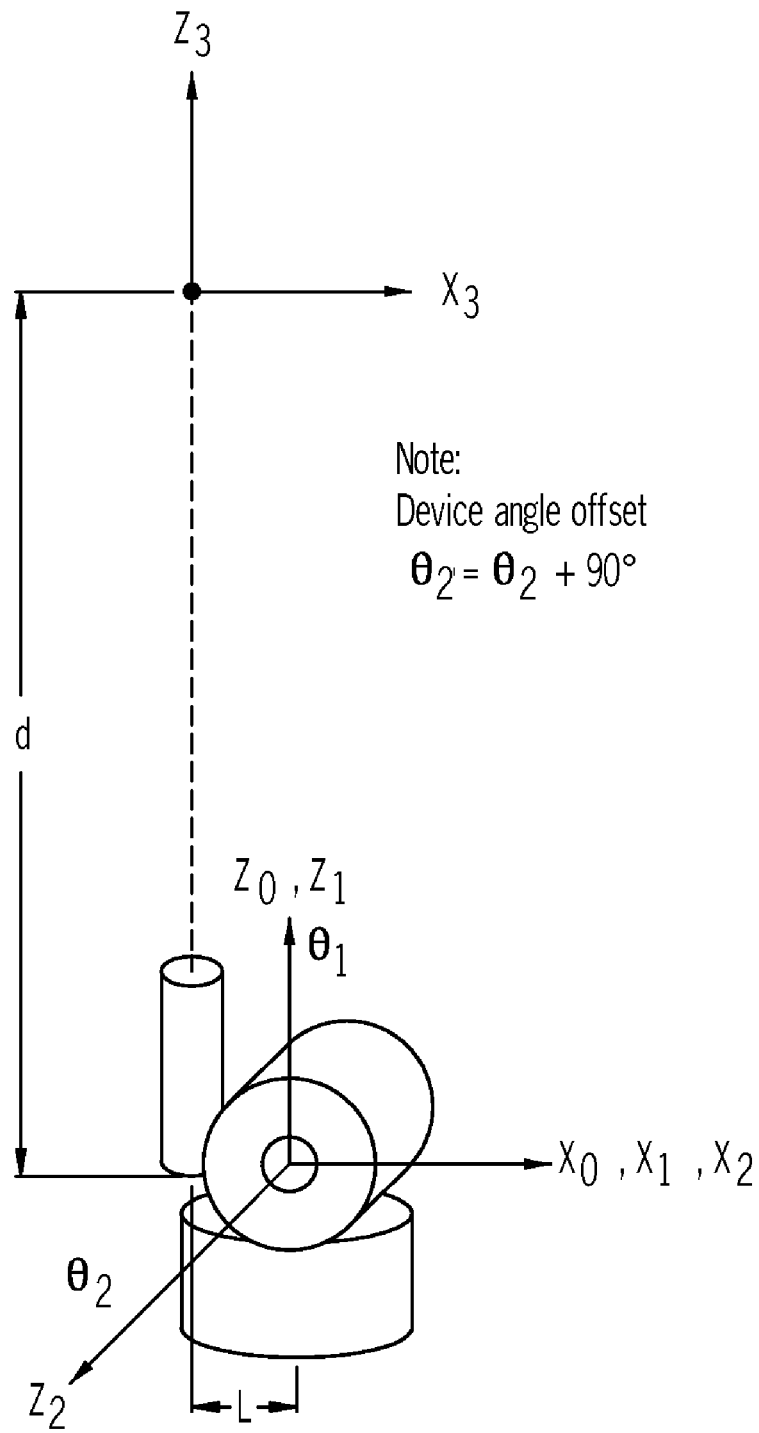
FIG. 5 is a graphical illustration of the kinematic system model of the local positioning system of FIG. 4.

The kinematics of the LPS 100 may be modeled as shown in FIG. 5, wherein the LPS 100 has three generalized coordinate frames associated with the pan $\theta_1$, tilt $\theta_2$, and distance d parameters. The parameter L may represent the distance that the sighting device 102 is displaced from the tilt axis $Z_2$ of the pan-tilt mechanism 106, and may be constant (e.g., zero). The Denavit-Hartenberg (D-H) parameters, which are used to generate the 4×4 homogeneous transformation matrices that define the relationship between the target and device coordinates systems, are provided in Table 1.

TABLE 1

| i | $\alpha_{i-1}$ | $a_{i-1}$ | $d_i$ | $\theta_i$ |
| --- | --- | --- | --- | --- |
| 1 | 0 | 0 | 0 | $\theta_1$ |
| 2 | 90° | 0 | 0 | $\theta_2$ |
| 3 | −90° | −L | d | 0 |

The Jacobian matrix is a multidimensional derivative that enables velocity transformation between joint space and Cartesian space. Therefore, solving for joint velocities of the LPS 100 can be accomplished using an inverse Jacobian matrix technique.

The Jacobian formulation is as follows:

$$\dot{X} = J(\Theta)\dot{\Theta} \quad \text{(Eq. 1)}$$

wherein, X is the Cartesian state vector of positions (x, y, z) and rotations ($\alpha$, $\beta$, $\gamma$), and $\dot{X}$ is the vector of Cartesian state velocities; $\Theta$ represents the generalized LPS device coordinates (pan, tilt, distance), also know as joint variables; $\dot{\Theta}$ is a vector of generalized device velocities, also known as joint velocities, and J is a multidimensional (n×m) matrix known as the Jacobian matrix that relates Cartesian velocities to joint velocities. Once J is known, it provides a way to convert joint velocities into Cartesian velocities.

However, what is needed for this application are the joint velocities given the Cartesian velocities. As such, the inverse Jacobian must be used. The inverse Jacobian formulation is as follows:

$$\dot{\Theta} = J^{-1}(\Theta)\dot{X} \quad \text{(Eq. 2)}$$

wherein $\Theta = f(X)$ from inverse kinematics.

There are two primary options for solving for the inverse Jacobian: numerically and symbolically. Since the solution of the Jacobian varies throughout the workspace for articulated mechanisms, it will need to be re-computed for each cycle of the real-time update loop (which occurs many times per second), therefore, it is desirable to use an efficient Jacobian computation process. Solving for the Jacobian and then inverting it numerically to obtain $J^{-1}$ is usually too computationally intensive for real-time control. Alternatively, when J and $J^{-1}$ are solved in symbolic form, the computational burden to obtain $J^{-1}$ in real-time is greatly reduced. Therefore, the symbolic form will be used and described below.

Using a symbolic velocity propagation technique, the Jacobian and the inverse Jacobian, defined in the device coordinate frame, were derived for the pan-tilt-distance device configuration as follows:

$$J = \begin{bmatrix} -\sin(\theta_1)(-\sin(\theta_2)d - \cos(\theta_2)L), & -\cos(\theta_1)\cos(\theta_2)d + \cos(\theta_1)\sin(\theta_2)L, & -\cos(\theta_1)\sin(\theta_2) \\ \cos(\theta_1)(-\sin(\theta_2)d - \cos(\theta_2)L), & -\sin(\theta_1)\cos(\theta_2)d + \sin(\theta_1)\sin(\theta_2)L, & -\sin(\theta_1)\sin(\theta_2) \\ 0, & -\sin(\theta_2)d - \cos(\theta_2)L, & \cos(\theta_2) \end{bmatrix} \quad \text{(Eq. 3)}$$

$$J^{-1} = \begin{bmatrix} \sin(\theta_1)/(\sin(\theta_2)d + \cos(\theta_2)L), & -\cos(\theta_1)/(\sin(\theta_2)d + \cos(\theta_2)L), & 0 \\ -\cos(\theta_1)\cos(\theta_2)/d, & -\sin(\theta_1)\cos(\theta_2)/d, & -\sin(\theta_2)/d \\ -(\sin(\theta_2)d + \cos(\theta_2)L)\cos(\theta_1)/d & -(\sin(\theta_2)d + \cos(\theta_2)L)\sin(\theta_1)/d, & \cos(\theta_2) - \sin(\theta_2)L/d \end{bmatrix} \quad \text{(Eq. 4)}$$

Special care may be taken to avoid singular device configurations which result in an ill-conditioned $J^{-1}$. Notice that the equation for $J^{-1}$ breaks down if the distance d is zero or if both angles $\theta_1$, $\theta_2$ are zero. These issues should be addressed by the controller.

In order to solve the inverse Jacobian equations, the instantaneous pose of the LPS 100, which is defined by the current joint variables (i.e., pan $\theta_1$, tilt $\theta_2$, and distance d), must be supplied to the controller. The required joint variables must be known before computation, but current values for these joint variables (after some motion has occurred) may not be immediately available. In that case, they must be re-measured or computed. Once $J^{-1}$ is solved, it may be used with the desired Cartesian velocities defined in the local coordinate system 122, 122' (FIGS. 3 and 4) of the target object 120, 120' to determine $\dot{\Theta}$ as described by Eq. 2 and Eq. 3.

The multi-axis articulation mechanism 106 may be queried for the pan $\theta_1$ and tilt $\theta_2$ angles with only a small, but still noticeable, cost in performance. Therefore, a pan-tilt approximation may be useful to improve performance. Furthermore, most laser-based distance measuring mechanisms 104 may be too slow to provide useful feedback for real-time velocity control. Therefore, an approximation of distance may be used.

Since the starting position defined in target Cartesian coordinates is known, the inverse kinematics of the LPS 100 can be used to determine the pan, tilt, and distance values. Using inverse kinematics to solve for the joint variables is an efficient technique, especially if the inverse kinematics equations are derived in a closed-form manner, as opposed to being solved iteratively.

At each iteration of the update loop, new target Cartesian coordinates may be required in order to provide an estimate of the pan, tilt, and distance values. For position playback, the intermediate points between the defined waypoints can be determined using any number of interpolation methods, such as a piecewise linear or a spline fit. The Cartesian velocity is determined by using these intermediate points and the system update rate. For interactive control, target coordinate waypoints are not available; instead the new Cartesian positions are generated on-the-fly from the real-time velocity inputs requested by the user. These positions can be estimated as follows:

$$\vec{P}_n = \vec{P}_{n-1} + v_n \Delta t + \frac{1}{2} a_n (\Delta t)^2 \quad \text{(Eq. 5)}$$

wherein $\vec{P}_n$ is the position vector, $\vec{P}_{n-1}$ is the position at the previous time step, $v_n$ is the desired velocity specified by the user, $a_n$ is the system acceleration parameter, and $\Delta t$ is the system time step.

It should be noted that this type of position update may not necessarily produce Cartesian points that lie on the surface of the target object when the surface is not planar. In many cases this deviation will be small and likely go unnoticed by the user. But if staying on the surface is required by the user, then a more accurate surface approximation, such as a CAD model, may be used instead.

For the complex surface situation, a ray (unit vector) defined by the pan and tilt angles is converted into local coordinates of the target, and then intersected with the surface model. In this case, a ray is intersected with the 3D virtual surface model, and the distance is determined from vector algebra using the 3D intersection point and the device location. For polygonal models, a triangle-ray intersection test can be performed to get the x, y, z position on the surface. This process scales up to allow use of arrays of triangles (or mathematical surfaces) of the CAD model.

Since this inverse kinematics-based update technique is a real-time approximation process, small tracking errors may develop during motion. In the interactive control mode, the deviation will probably not be perceived by the user. But controlling the error may be important for achieving accurate tracking in the automated path playback mode. To address this situation, an actual measurement of the pan and tilt angles can be made at a less frequent update rate (e.g., $100*\Delta t$) and then a filter can be applied to gradually correct for the tracking error.

Figure 7A:
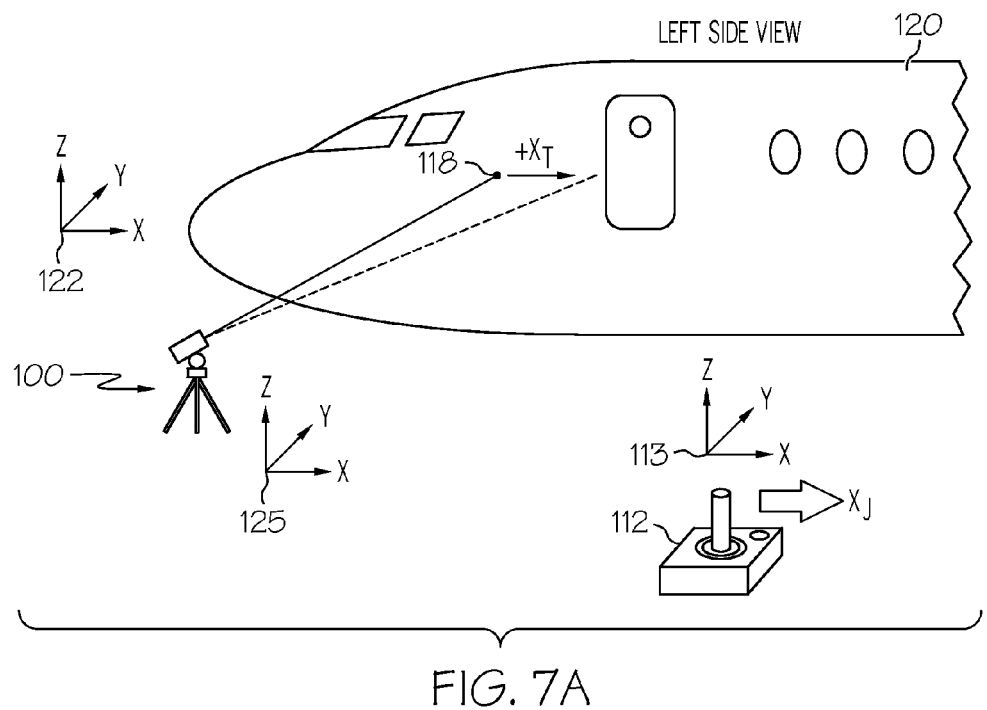
FIGS. 7A and 7B are schematic illustrations of the disclosed local positioning system controlling motion in the coordinate system of a target object from two different points of view.
Figure 7B:
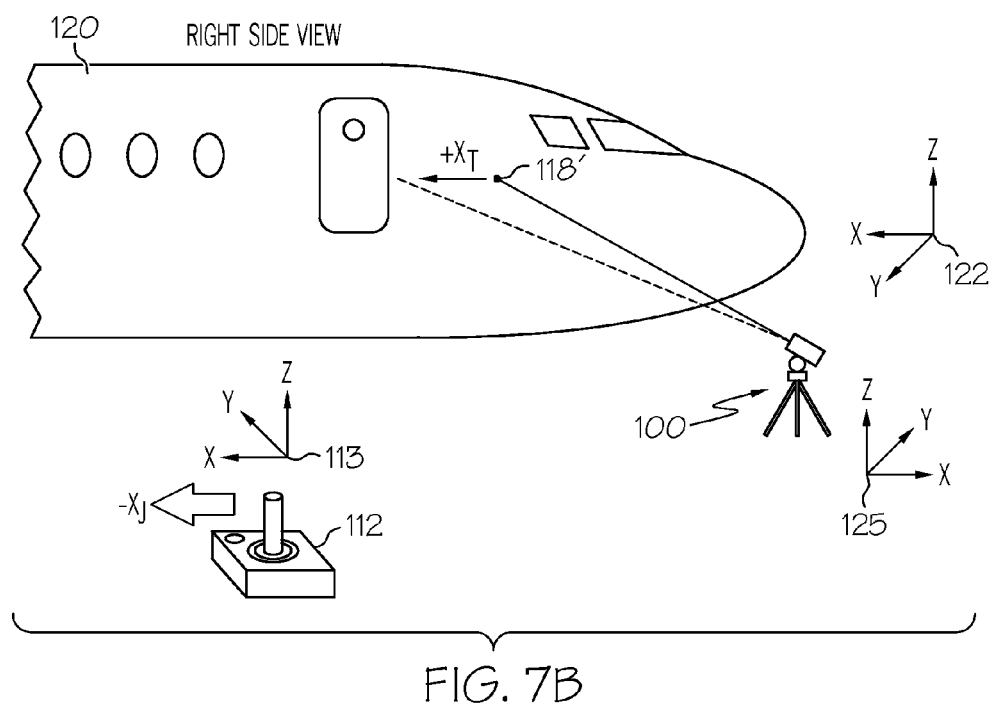

Finally, a process must be provided for defining the desired velocity in the target coordinate system, which is the input Cartesian velocity for Eq. 1, 2, and 5. For example, as shown in FIG. 3, the input device 112 may be a joystick with at least two axes, wherein the X and Y motions of the joystick may be applied directly to control the pan and tilt velocities in device coordinates. However, defining velocities in the target object coordinate system 122 that produces intuitive interactive control for the user involves selecting how the three Cartesian dimensions in target coordinates will be mapped to the two axes of the joystick. This selection is dependent on the relative orientation of the user to the target, as shown in FIGS. 7A and 7B.

For example, at one viewpoint location, the user inputs right motion on the input device 112 and the target location 118 moves in the positive X direction ($+X_T$ in FIG. 7A) in the local coordinates 122 of the target object 120, which matches the direction of the input device motion ($+X_J$). However, if the user were to move to the other side of the target object 120, the opposite input device motion ($-X_J$) is required to produce a motion of the target location 118 in the positive X direction in the local target coordinates 122 ($+X_T$ in FIG. 7B).

To address this issue a technique common to 3D applications in computer graphics called viewpoint compensation may be used. The goal is to select a coordinate transformation that allows left-right, up-down motions of the input device 112 to match motion directions in the local coordinates 122 of the target object 120 when the user is facing the part of the target object 120 where the beam is intersecting.

Surface normals from the CAD model or an approximate surface (such as one produced by the calibration points) can be used to specify the transformation matrix that defines the view direction. In practice, it turns out that a simple, but effective approximate method is sometimes easier to use. The concept is based on user selection of one of the faces of an axis-aligned cube. The faces of the cube approximate the orientation of the surface of interest on the target object. This results in a discrete number of possible viewpoints.

In the case of the cube-based approximation, each face has four axis-aligned possibilities, for a total of 24, but with a known up-vector, the number of useful viewpoints is reduced to 12.

It will be appreciated that this simple technique may cause the virtual surface to deviate from the true surface for some types of target objects, especially those with highly curved surfaces. Therefore, it may be desirable to use the surface normal vectors from the CAD or approximate surface as the viewpoint selection.

Figure 6:
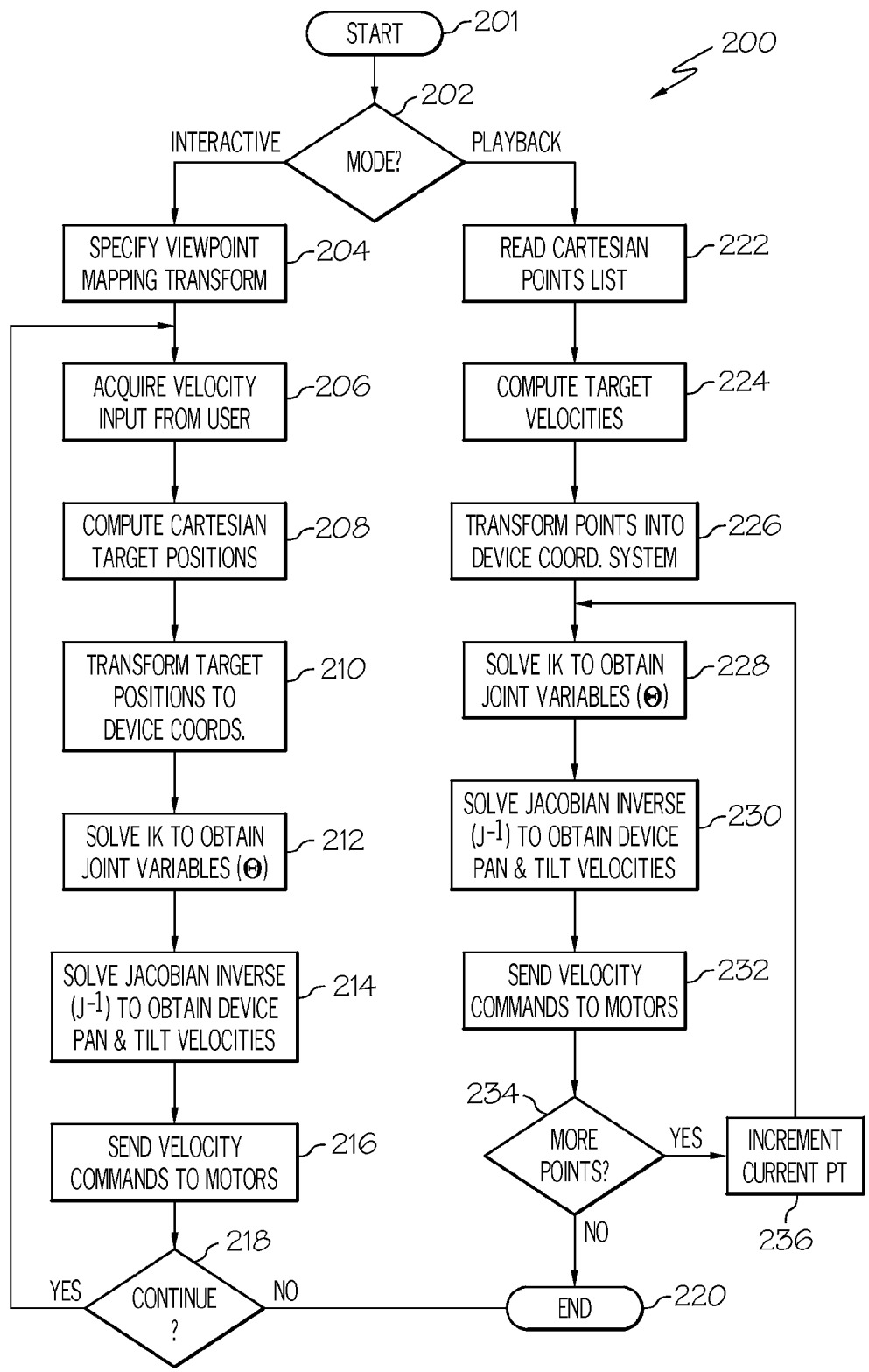
FIG. 6 is a flow chart illustrating one aspect of the disclosed method for controlling a local positioning system using Jacobian-based velocity control.

Focusing now on an embodiment of the concept in which the multi-axis articulation mechanism 106 is a 2-axis pan-tilt unit, a description of the process flow is given in FIG. 6. In one aspect, the controller 108 may be configured to control the pan and tilt velocities of the pan-tilt unit 106 of the LPS 100 in accordance with the method 200 shown in FIG. 6. Prior to reaching the "Start" block 201, the LPS 100 may undergo measurement device-to-target calibration and the calibration matrix for transforming positions and rotations between coordinate systems may be obtained. For example, the measurement device-to-target calibration and the calibration matrix may be obtained in accordance with the disclosure of U.S. Ser. No. 12/235,161 filed on Sep. 22, 2008, the entire contents of which are incorporated herein by reference.

As shown in decision block 202, the user may be prompted to select either the interactive control mode or automated position playback mode. When the interactive control mode is selected, the user may then select the viewpoint specific motion coordinate mapping that defines how the velocity inputs from the input device 112 are to be applied in the target coordinate system 122, as shown in block 204. At block 206, the controller 108 may acquire the desired velocity input from the user by way of the input device 112. Then, the Cartesian target positions may be computed (block 208) and transformed to device coordinates (block 210), such that the inverse kinematics may be solved to obtain the current joint variables (block 212). As shown in block 214, the desired velocities ($\dot{X}$) provided by the user and the current pan-tilt-distance position data ($\Theta$) are used by the inverse Jacobian equations to arrive at the new pan-tilt velocities needed to produce the target coordinate velocities specified by the user. Finally, the controller 108 may communicate the new pan and tilt velocities commands to the pan-tilt unit 106, as shown in block 216. Decision block 218 may facilitate a continuous update loop. If no additional motion is required, then the process may exit at block 220.

A similar process may occur in the automated position playback mode. When automated position playback mode is selected (block 202), the method 200 may proceed by reading a stored Cartesian points list (block 222), computing the target velocities (block 224), and transforming the points into device coordinates (block 226). Then, as shown in block 228, the inverse kinematics may be solved to obtain the current joint variables. As shown in block 230, the computed target velocities ($\dot{X}$) and the current pan-tilt-distance position data ($\Theta$) are used by the inverse Jacobian equations to arrive at the new pan-tilt velocities needed to produce the target coordinate velocities specified by the routine. The controller 108 may communicate the new pan and tilt velocities commands to the pan-tilt unit 106, as shown in block 232. Then, at decision block 234 additional target points may be selected from the points list and inserted into the routine, at block 236, which then returns at a location prior to block 228 to start the cycle again. If no additional points are required, the process may exit at block 220.

Figure 4:
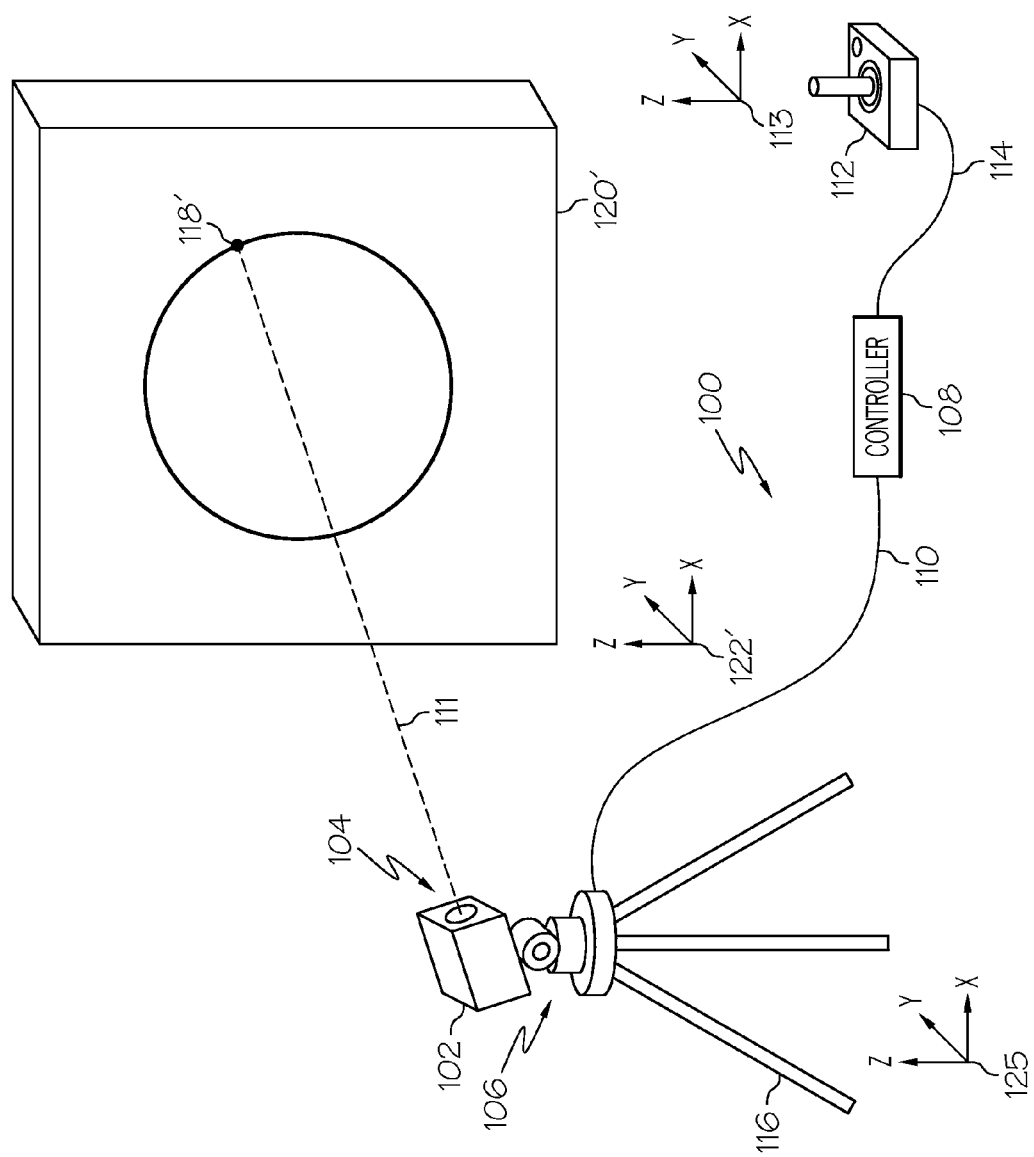
FIG. 4 is a partially schematic perspective view of the local positioning system of FIG. 3, shown tracing a circle on a target object.

Accordingly, as shown in FIGS. 3 and 4, the use of Jacobian-based velocity control may allow for precise motion direction control of an aim point 118, 118' on a target object 120, 120' in both interactive control mode and automated position playback mode, thereby allowing a user to generate specific target motions (such as straight line motion) in interactive control mode (FIG. 3) and continuous, velocity controlled, aim point motion in automated position playback mode (FIG. 4).

Figure 8:
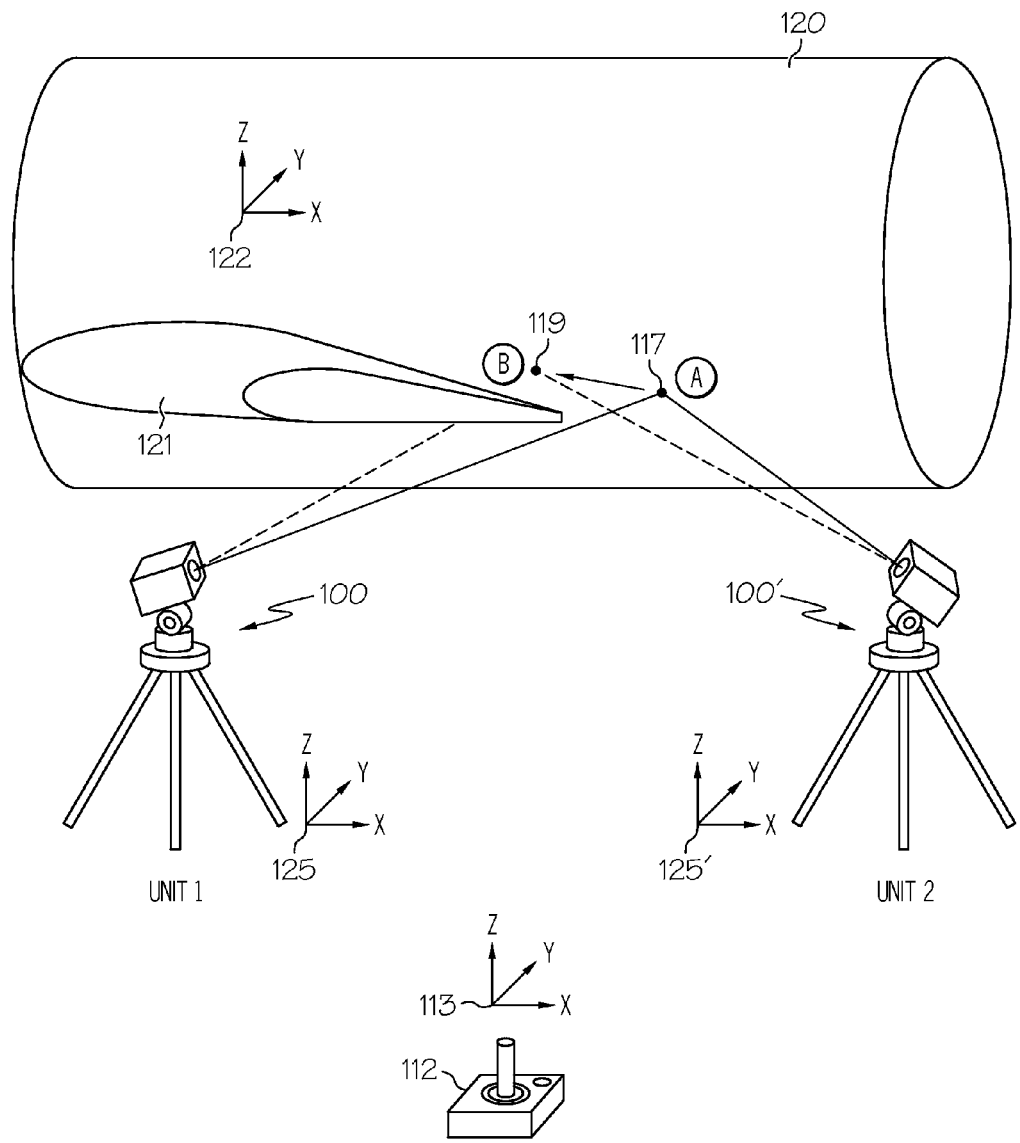
FIG. 8 shows an example use case in which simultaneous control of multiple local positioning devices is enabled by the techniques presented in this application.

Referring to FIG. 8, in one optional aspect, multiple local positioning devices 100, 100' may be simultaneously controlled by the same high-level inputs (either by interactive or automatic control). This capability may be enabled by the ability of the separate local positioning devices 100, 100' to move along the same target coordinate path with the same velocity. Without this type of control, the local positioning devices 100, 100' may all start at one position and end at another, but their path traces would diverge between the end points and they would not arrive at the same time.

For example, both devices 100, 100' may initially target position 'A' (117), and then may move toward position 'B' (119) on the surface of the target object 120. Both beams may terminate at the same aim point and may move at the same rate on the target surface 120, until the motion nears position 'B', at which time the beam of LPS 100 is occluded by object 121. At this point, LPS 100 is no longer providing useful information to the user, but the task continues uninterrupted from the user's point of view, since LPS 100' is still able to target the desired aim point on target object 120.

So far in the discussion it has been assumed that the target itself, as well as the LPS base (support structure), is stationary, i.e., that there is no relative velocity between the LPS and target coordinate systems. But if the relative velocity is known, the control process described here can be modified to compensate for this motion and still produce the desired aim point velocity on the target object. The ability to work with moving target objects further enhances the capabilities of the method by allowing a wider variety of conditions in which the system can operate. This enables usage of the system in applications such as moving assembly lines.

The relative motion compensation process may proceed as follows: The base velocity of the LPS unit may be converted into target coordinates using a pre-multiplication of the LPS base velocity vector by the system calibration transformation matrix. The difference between this vector and the target object velocity may then be computed and applied (using vector addition) to the desired aim point velocity. This result may then be used for the rest of the computation as described in the flow diagram of FIG. 6, which would be at block 206 for interactive motion, or block 224 for playback motion. It should also be noted that the calibration matrix may need to be recomputed during this process.

Although not explicitly discussed here, the Cartesian accelerations defined in local target coordinates can be controlled in the same way as the local target velocities.

Although various aspects of the disclosed local positioning system have been shown and described, modifications may occur to those skilled in the art upon reading the specification. The present application includes such modifications and is limited only by the scope of the claims.

What is claimed is:

1. A local positioning system comprising:
   a sighting device for indicating an aim point on a target object, said target object having a local coordinate system;
   an articulation mechanism connected to said sighting device to effect movement of said sighting device about at least two independent axes; and
   a controller in communication with said articulation mechanism, said controller being configured to control a velocity of said sighting device about each of said independent axes to obtain desired motion of said aim point on said target object in said local coordinate system, said controller being programmed to receive Cartesian target positions, transform said Cartesian target positions to device coordinates, solving inverse kinematics to obtain current joint variables from said device coordinates, and apply inverse Jacobian equations to current pan and tilt position data and user supplied velocities to arrive at new pan and tilt velocities needed to produce target coordinate velocities.

2. The local positioning system of claim 1 wherein said sighting device includes a laser, and wherein said laser projects a beam onto said aim point.

3. The local positioning system of claim 1 further comprising a distance measuring mechanism configured to measure a distance between said sighting device and said aim point, wherein said distance measuring mechanism is in communication with said controller.

4. The local positioning system of claim 3 wherein said distance measuring mechanism includes a laser range finder.

5. The local positioning system of claim 4 wherein said laser range finder and said sighting device are one and the same.

6. The local positioning system of claim 1 wherein said articulation mechanism includes a pan actuator and a tilt actuator, and wherein said controller is in communication with said pan actuator and said tilt actuator to control a velocity of said sighting device about a pan axis and a tilt axis.

7. The local positioning system of claim 1 further comprising a second sighting device for indicating said aim point on said target object, said second sighting device being connected to a second articulation mechanism configured to effect movement of said second sighting device about at least two independent axes, wherein said second articulation device is in communication with said controller and synchronized with said first articulation device.

8. The local positioning system of claim 1 further comprising an input device in communication with said controller, wherein said input device is configured to communicate signals indicative of said desired motion of said aim point.

9. The local positioning system of claim 1 wherein said target object is moving relative to said sighting device.

10. A local positioning system comprising:
    a sighting device for indicating an aim point on a target object, said target object having a local coordinate system;
    a pan-tilt unit connected to said sighting device to effect movement of said sighting device about a pan axis and a tilt axis; and
    a controller in communication with said pan-tilt unit, said controller being configured to control a velocity of said sighting device about said pan axis and a velocity of said sighting device about said tilt axis to obtain desired motion of said aim point on said target object in said local coordinate system, said controller being programmed to receive Cartesian target positions, transform said Cartesian target positions to device coordinates, solve inverse kinematics to obtain current joint variables from said device coordinates, and apply inverse Jacobian equations to current pan and tilt position data and user supplied velocities to arrive at new pan and tilt velocities needed to produce target coordinate velocities.

11. The local positioning system of claim 10 wherein said sighting device includes a laser, and wherein said laser projects a beam onto said aim point.

12. The local positioning system of claim 10 further comprising a distance measuring mechanism configured to measure a distance between said sighting device and said aim point, wherein said distance measuring mechanism is in communication with said controller.

13. The local positioning system of claim 12 wherein said distance measuring mechanism includes a laser range finder.

14. The local positioning system of claim 13 wherein said laser range finder and said sighting device are one and the same.

15. The local positioning system of claim 10 further comprising an input device in communication with said controller, wherein said input device is configured to communicate signals indicative of said desired motion of said aim point.

16. A method for controlling an aim point on a target object, said target object having a local coordinate system, said method comprising the steps of:

providing a sighting device for indicating said aim point on said target object providing an articulation mechanism, connected to said sighting device, that effects movement of said sighting device about at least two independent axes, said articulation mechanism including a pan actuator that moves said sighting device about a pan axis and a tilt actuator that moves said sighting device about a tilt axis;

obtaining a target velocity of said aim point in said local coordinate system;

determining a joint velocity about each of said independent axes required to effect said target velocity, said determining step including acquiring Cartesian target positions, transforming said Cartesian target positions to device coordinates, solving inverse kinematics to obtain current joint variables from said device coordinates, and applying inverse Jacobian equations to current pan and tilt position data and user supplied velocities to arrive at new pan and tilt velocities needed to produce target coordinate velocities; and communicating said joint velocities to said articulation mechanism.

17. The method of claim 16 wherein said sighting device includes a laser, and wherein said laser projects a beam onto said aim point.

18. The method of claim 16 wherein said target velocity is obtained from an input device.

19. The method of claim 16 wherein said target velocity is obtained from a playback mode database.

\* \* \* \* \*